C. W. DICKINSON.
GRAIN DRILL.
APPLICATION FILED SEPT. 7, 1909.
964,767.
Patented July 19, 1910.
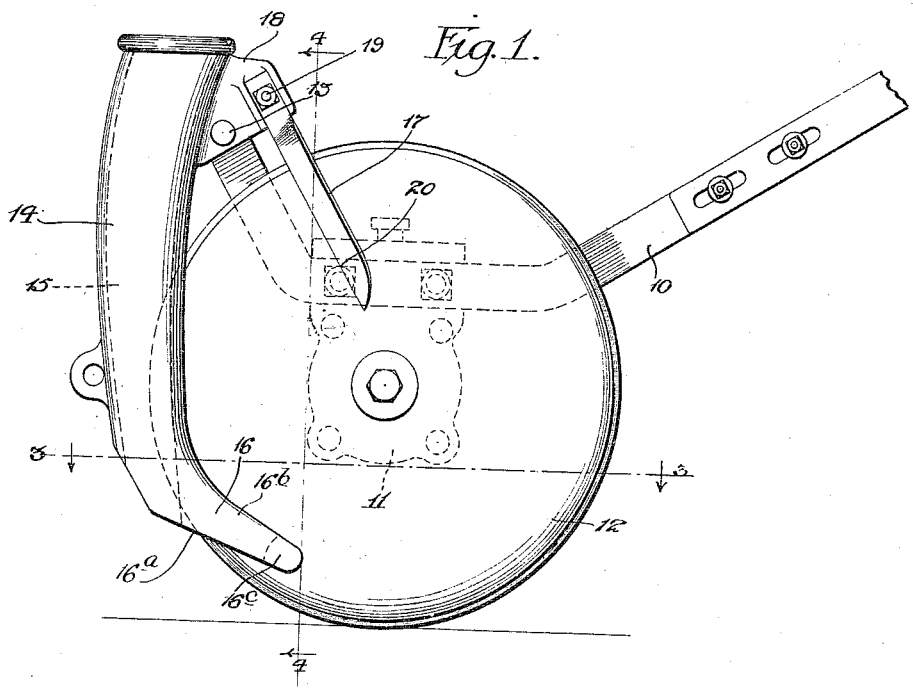
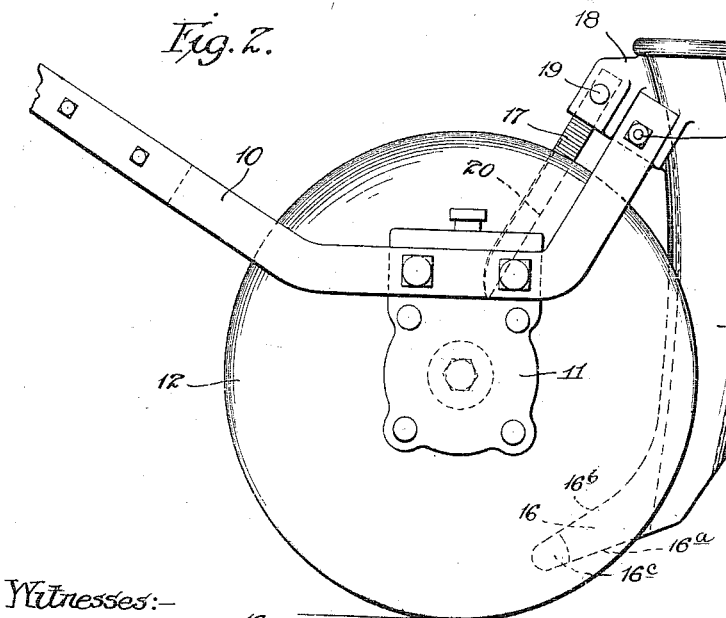
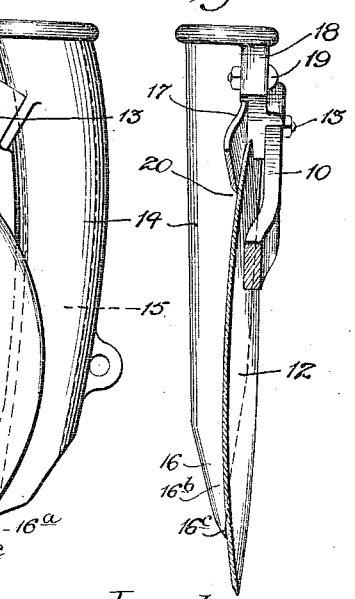
Witnesses:—
Frank W. Bauer
H. C. Petersen
Inventor:—
Clinton W. Dickinson
By: Fred Gerlach
his Atty.

UNITED STATES PATENT OFFICE.

CLINTON W. DICKINSON, OF LA CROSSE, WISCONSIN, ASSIGNOR OF ONE-HALF TO ALBERT HIRSHHEIMER, OF LA CROSSE, WISCONSIN.

GRAIN-DRILL.

964,767.  Specification of Letters Patent.  Patented July 19, 1910.

Application filed September 7, 1909. Serial No. 516,512.

*To all whom it may concern:*

Be it known that I, CLINTON W. DICKINSON, a resident of La Crosse, in the county of La Crosse and State of Wisconsin, have invented certain new and useful Improvements in Grain-Drills, of which the following is a full, clear, and exact description.

The invention relates to grain-drills embodying furrow-openers comprising an angled concavo-convex disk for cutting and seed-boots for delivering the seed into the furrows cut by the disks.

The invention designs to provide a disk furrow-opener of improved construction, whereby the gathering of trash at the lower end of the boot will be effectively obviated.

The invention further designs to provide simple and efficient means for keeping the land side of the disk clean.

Lastly, the invention designs to provide a disk furrow-opener of simple construction and which will operate efficiently in use.

The invention consists in the several novel features hereinafter set forth and more particularly defined by claims at the conclusion hereof.

In the drawings: Figure 1 is an elevation of a furrow-opener embodying the invention and showing the land or convex side of the disk. Fig. 2 is an elevation of the concave side of the disk. Fig. 3 is a horizontal section on line 3—3 of Fig. 1. Fig. 4 is a vertical section taken on line 4—4 of Fig. 1.

10 denotes a drag-bar which may be of any suitable construction and which is usually pivoted at its front end to the drill-frame in such manner that the furrow-opener may be lowered into, or raised out of the soil as well understood in the art. A suitable hanger-bearing 11 is secured to the drag-bar and in said hanger, a concavo-convex disk 12 is journaled by means of a suitable bearing. The drag-bar 10 is extended upwardly and rearwardly from the hanger 11 and has secured thereto by a bolt 13, a seed-boot 14 through which extends a seed-conduit 15 for conducting the seed into the furrow cut by the disk. The disk is supported by the drag-bar and hanger to travel at an angle to the line of draft so as to cut a furrow as it is drawn forwardly in the ground. Boot 14 is disposed behind the disk or within the angle thereof and the seed-conduit 15 is extended to the bottom of the boot to deliver the seed into the furrow cut by the disk, adjacent and rearwardly of the edge of the disk and a finger 16 which may be integrally formed with the boot, extends forwardly and downwardly from the lower or front end of the boot and the front or lower end 16ᵉ of said finger is disposed to fit against or lie in close proximity to the disk, so that when the disk rotates and is being operated in trashy soil, the trash will be directed laterally or to the land-side of the boot and thus the accumulation of trash at the lower end of the boot will be effectively obviated.

The point 16 is disposed to lie adjacent the convex face of the disk adjacent the outer edge of the disk and extends approximately parallel to the direction of travel of that portion of the disk adjacent which it is disposed, and as a result of this arrangement, a narrow finger suffices to prevent dirt or trash from being carried upwardly by the rotating disk, so that accumulation of trash around the boot or between the disk and the boot, will be effectively prevented, the trash and dirt being deflected to one side of the boot where it will not interfere with the even discharge of the seed from the conduit 15.

The tip or front terminal of the finger is disposed somewhat closer to the disk-axis than the front of the boot or inwardly of that portion of the disk which travels at the side of or nearest the boot, and resultantly the finger-tip engaging the disk and the outer side of the finger between the tip and the boot, will deflect laterally any trash or soil adhering to or lying against the edge-portion of the disk, and which would be packed by the rotating disk against the front of the boot or between the disk and the boot.

In practice it has been found that the soil or trash adhering to the disk adjacent the outer edge thereof is most likely to interfere with the even deposit of the seed and by providing a downwardly and forwardly extending finger between the lower end of the boot and the convex face of the disk, the device will, in operation, prevent the accumulation of trash or soil around the boot or beneath the seed outlet. The downwardly and forwardly extending finger is adapted to enter the furrow behind the disk and extend to a point in close proximity to the bottom of the furrow, so that the surface trash will be deflected laterally by the side of the finger and the outer side of the boot and so that the furrow will not be closed by the return of the soil until the seed has been deposited. This construction results in minimizing the retardation of the disk as compared with a device in which an upwardly extending blade or scraper is disposed adjacent the lower end of the boot and leaves substantially all of that portion of the disk, which is in the soil, free to agitate the soil without directing the trash to a place where it would clog the disk or boot. Furthermore, the forwardly and downwardly extending finger, sufficiently tends to steady the disk against the pressure exerted by the soil against the concave face of the disk. The lower edge 16$^a$ of the finger extends downwardly and forwardly to provide clearance below the end of the seed-conduit which will prevent accumulation there, and the front end 16$^c$ and its upper edge 16$^b$ of the finger are shaped to avoid sharp angles or lodging places for trash.

A scraper 17 is secured to a lug 18 on the seed-boot 14 by a bolt 19. This scraper extends forwardly and downwardly and has a scraping edge 20 engaging the concave face of the disk to remove any soil which may adhere thereto. In practice it is sometimes necessary to replace a disk or a dragbar and by securing the scraper 17 to the boot so that it will be removable with the boot, it is only necessary to remove a bolt 13 and then the boot and the scraper 17 may be conjointly removed. Resultantly, the disk may be removed without separately disconnecting the boot and scraper from the drag-bar or support connected thereto.

The invention is not to be understood as restricted to the details shown and described since these may be modified within the scope of the appended claims without departing from the spirit and scope of the invention.

Having thus described the invention, what I claim as new and desire to secure by Letters Patent, is:

1. In a grain drill, the combination of a concavo-convex disk, means for supporting the disk to travel at an angle to the line of draft, a boot having a seed-conduit therein, and a forwardly and downwardly extending finger projecting from the lower end of the boot and terminating adjacent the outer portion of the disk and at the convex face thereof, whereby soil or trash will be deflected.

2. In a grain drill, the combination of a concavo-convex disk, means for supporting the disk to travel at an angle to the line of draft, a boot having a seed conduit therein, and a forwardly and downwardly extending finger projecting from the lower end of the boot and having a disk-engaging tip adjacent the outer portion of the convex face of the disk, whereby soil and trash will be deflected.

3. In a grain drill, the combination of a concavo-convex disk, means for supporting the disk to travel at an angle to the line of draft, a boot having a seed-conduit therein and a tapered finger projecting from the boot, having both its upper and lower edges extending downwardly and forwardly, and having a disk-engaging tip adjacent the outer portion of the convex face of the disk, whereby soil and trash will be deflected.

4. In a grain drill, the combination of a concavo-convex disk, means for supporting the disk to travel at an angle to the line of draft, a boot having a seed-conduit therein and a forwardly and downwardly extending finger integral with and projecting from the lower end of the boot and terminating adjacent the outer portion of the disk and at the convex face thereof, whereby soil or trash will be deflected.

5. In a grain drill, the combination of a concavo-convex disk, means for supporting the disk to travel at an angle to the line of draft, a boot having a seed-conduit therein and a forwardly and downwardly extending finger integral with and projecting from the lower end of the boot and having a disk-engaging tip adjacent the outer portion of the convex face of the disk, whereby soil and trash will be deflected.

6. In a grain drill, the combination of a concavo-convex disk, means for supporting the disk to travel at an angle to the line of draft, a boot having a seed-conduit therein and a tapered finger integral with and projecting from the boot, having both its upper and lower edges extending downwardly and forwardly, and having a disk-engaging tip adjacent the outer portion of the convex face of the disk, whereby soil and trash will be deflected.

7. In a grain drill, the combination of a concavo-convex disk, means for supporting the disk to travel at an angle to the line of draft, a boot having a seed-conduit therein, a forwardly and downwardly extending finger projecting from the lower end of the boot and terminating adjacent the outer portion of the disk and at the convex face thereof, whereby soil or trash will be deflected, and a scraper engaging the upper portion of the convex face of the disk.

8. In a grain drill, the combination of a concavo-convex disk, means for supporting the disk to travel at an angle to the line of draft, a boot having a seed-conduit therein, a forwardly and downwardly extending finger projecting from the lower end of the boot and having a disk-engaging tip adjacent the outer portion of the convex face of the disk, whereby soil and trash will be deflected, and a scraper engaging the upper portion of the convex face of the disk.

9. In a grain drill, the combination of a concavo-convex disk, means for supporting the disk to travel at an angle to the line of draft, a boot having a seed-conduit therein, a tapered finger projecting from the boot, having both its upper and lower edges extending downwardly and forwardly, and having a disk-engaging tip adjacent the outer portion of the convex face of the disk, whereby soil and trash will be deflected, and a scraper engaging the upper portion of the convex face of the disk.

CLINTON W. DICKINSON.

Witnesses:
R. D. FENTRESS,
NELLE G. JONES.